(12) United States Patent
Sodhi

(10) Patent No.: US 11,028,311 B2
(45) Date of Patent: Jun. 8, 2021

(54) METHODS OF CEMENTING A WELLBORE

(71) Applicant: Thomas S. Sodhi, New Caney, TX (US)

(72) Inventor: Thomas S. Sodhi, New Caney, TX (US)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 0 days.

(21) Appl. No.: 16/835,620

(22) Filed: Mar. 31, 2020

(65) Prior Publication Data

US 2020/0339862 A1 Oct. 29, 2020

Related U.S. Application Data

(60) Provisional application No. 62/839,140, filed on Apr. 26, 2019.

(51) Int. Cl.
| | |
|---|---|
| C09K 8/467 | (2006.01) |
| C04B 24/38 | (2006.01) |
| C04B 28/02 | (2006.01) |
| C04B 103/40 | (2006.01) |
| E21B 43/22 | (2006.01) |
| E21B 33/138 | (2006.01) |
| E21B 33/14 | (2006.01) |

(52) U.S. Cl.
CPC .............. C09K 8/467 (2013.01); C04B 24/38 (2013.01); C04B 28/02 (2013.01); E21B 33/14 (2013.01); C04B 2103/40 (2013.01)

(58) Field of Classification Search
CPC ....... C04B 24/38; C04B 28/04; C04B 22/124; C04B 7/02; C09K 8/514; C09K 2208/08; C09K 8/426; C09K 8/508; E21B 21/003; E21B 33/138; E21B 33/14
See application file for complete search history.

(56) References Cited

U.S. PATENT DOCUMENTS

| | | |
|---|---|---|
| 5,718,916 A | 2/1998 | Scherr |
| 2009/0052117 A1 | 2/2009 | Cadek et al. |
| 2012/0090841 A1 | 4/2012 | Reddy et al. |
| 2012/0241155 A1 | 9/2012 | Ali et al. |
| 2015/0060072 A1* | 3/2015 | Busby ............... C09K 8/20 166/294 |
| 2015/0191642 A1 | 7/2015 | Nguyen et al. |
| 2016/0264840 A1 | 9/2016 | Nelson |
| 2019/0023966 A1* | 1/2019 | Reddy ............... C04B 22/0093 |

OTHER PUBLICATIONS

International Search Report for International Application No. PCT/US2020/028701, International Filing Date Apr. 17, 2020, dated Jul. 29, 2020, 3 pages.
Written Opinion for International Application No. PCT/US2020/028701, International Filing Date Apr. 17, 2020, dated Jul. 29, 2020, 7 pages.

* cited by examiner

*Primary Examiner* — Zakiya W Bates
(74) *Attorney, Agent, or Firm* — Cantor Colburn LLP

(57) ABSTRACT

A method of cementing a wellbore comprises combining an alginate suspension additive with a cement slurry to form a cementing composition, the cement slurry comprising an aqueous carrier and a cementitious component; injecting the cementing composition into the wellbore; and allowing the cement composition to set.

14 Claims, No Drawings

METHODS OF CEMENTING A WELLBORE

CROSS REFERENCE TO RELATED APPLICATIONS

This application claims the benefit of an earlier filing date from U.S. Provisional Application Ser. No. 62/839,140 filed Apr. 26, 2019, the entire disclosure of which is incorporated herein by reference.

BACKGROUND

In the oil and gas industry, cementing is a technique employed during many phases of borehole operations. For example, a cement slurry may be employed to cement or secure various casing strings and/or liners in a well. In other cases, cementing may be used in remedial operations to repair casing and/or to achieve formation isolation. In still other cases, cementing may be employed to isolate selected zones in the borehole and to temporarily or permanently abandon a borehole. Because of the extensive use of cement in the oil and gas industry, the art would be receptive to alternative materials and methods for cementing wellbores.

SUMMARY

A method of cementing a wellbore comprises combining an alginate suspension additive with a cement slurry to form a cementing composition, the cement slurry comprising an aqueous carrier and a cementitious component; injecting the cementing composition into the wellbore; and allowing the cement composition to set.

A cement composition comprises a cementitious component; an aqueous carrier; an alginate suspension additive; and an cement additive comprising a setting accelerator, a setting retardant, a gelling agent, a fluid loss control agent, an extender, a defoamer, a weighting agent, a dispersant, a thixotropic agent, a bridging agent or lost circulation material, a silicate material, a clay stabilizer, or a combination comprising at least one of the foregoing.

DETAILED DESCRIPTION

It has been found that alginate additives can be added to cement slurries to help solids in the slurries to remain suspended. Advantageously, the alginate additives are compatible with the components that are commonly used in cement slurries. Further, the alginate additives are environmentally friendly and can be obtained from natural resources.

The alginate suspension additive comprises alginate, alginic acid, sodium alginate, potassium alginate, ammonium alginate, calcium alginate, zinc alginate, or a combination comprising at least one of the foregoing. Alginates are known and have been described, for example, in U.S. Pat. No. 5,718,916. Alginates can be isolated from various species of seaweeds such as *Macrocystis pyrifera, Laminaria hyperborea*, and the like. Alginates can contain mannuronic acid and guluronic acid in various relative ratios, depending upon the species of seaweed from which they are extracted. Aginic acid and alginate salts can be derived from alginates. In an embodiment, the alginate suspension additive comprises an extract from a brown seaweed, which is also known as *Fucus vesiculosus* or biadderwrack.

The alginate suspension additive as disclosed herein can be combined with a cement slurry as a solid additive. The alginate suspension additive are added in an amount of about 0.01 to about 5 wt. % based on the weight of the aqueous carrier in the cement slurry. When the alginate additive is added in an amount of less than 0.01 wt %, it is believed that there is no detectable improvement on the suspending performance of the cement slurries. On the other hand, when the alginate additive is added in an amount of greater than 5 wt. %, there is no further improvement on the suspending performance of the cement slurries, and the presence of greater than about 5 wt. % of alginate additive increase the cost and may compromise other desired properties of the cement slurries.

The cement slurries comprise an aqueous carrier, a cementitious component, and a cement additive comprising a setting accelerator, a setting retardant, a gelling agent, a fluid loss control agent, an extender, a defoamer, a weighting agent, a dispersant, a thixotropic agent, a bridging agent or lost circulation material, a silicate material, a clay stabilizer, or a combination comprising at least one of the foregoing.

The aqueous carrier is present in the cement slurries in an amount of about 10% to about 60% by weight, more preferably in an amount of about 20% to about 40% by weight, based on the total weight of the cement slurry. The aqueous carrier fluid can be fresh water, brine (including seawater), an aqueous base, or a combination comprising at least one of the foregoing.

The cementitious component of the cement slurry can be any cementitious material that sets and hardens by reaction with water, and is suitable for forming a set cement downhole, including mortars and concretes. Suitable cement components include those typically employed in a wellbore environment, for example those comprising calcium, aluminum, silicon, oxygen, and/or sulfur. Such cements include, but are not limited to, Portland cements, pozzolan cements, gypsum cements, high alumina content cements, silica cements, and high alkalinity cements, or combinations of these. Portland cements are particularly useful. In some embodiments, the Portland cements that are suited for use are classified as Class A, B, C, G, and H cements according to American Petroleum Institute, API Specification for Materials and Testing for Well Cements, and ASTM Portland cements classified as Type I, II, III, IV, and V. The cements herein also can include various concretes by the further addition of aggregates, such as a coarse aggregate made of gravel or crushed rocks such as chert, quartzite, granite, and/or a fine aggregate such as sand or crushed sand. Aggregate can be added in an amount of about 10% to about 70% by weight of the hydraulic cement, and more particularly about 20% to about 40% by weight.

The cementitious component can be present in the slurry in an amount of about 50 to about 95 wt. %, preferably about 60 to about 90 wt. %, more preferably about 65 to about 85 wt. %, based on the total weight of the cement slurry.

The cement slurries can further comprise other components known for use in cementing, for example a fluid loss control agent, an extender to lower density, a gelling agent to increase viscosity, a defoamer to reduce foaming, a weighting agent to increase density, a foaming agent to reduce density, a dispersant to reduce viscosity, other fluid loss control agents, thixotropic agents, a bridging agent or lost circulation material (e.g., gilsonite or cellophane flakes), silicate materials such as sand, silica flour, fumed silica, act to strengthen cement as well as protect from strength retrogression effects at temperatures above 230° F., clay stabilizers, or a combination comprising at least one of the foregoing. These additive components are selected to avoid imparting unfavorable characteristics to the cement slurries, and to avoid damaging the wellbore or subterranean formation. Each additive can be present in amounts generally known to those of skill in the art.

Setting accelerators include compounds such as triethanolamines, calcium chloride, potassium chloride, sodium chloride, sodium formate, sodium nitrate, and other alkali and alkaline earth metal halides, formates, nitrates, and sulfates.

Setting retardants include compounds such as such as hydroxycarboxylic acids and their salts, such as sodium tartrate, sodium citrate, sodium gluconate, sodium itaconate, tartaric acid, citric acid, and gluconic acid, lignosulfonates, saccharides, polysaccharides, organophosphates such as $C_{2-12}$ alkylene phosphonic acids, salts such as sodium chloride, and oxides of zinc and lead, and the like.

Gelling agents include welan, xanthan, diutan, dextran gum, starch, starch derivatives, polysaccharides, cellulose, cellulosic derivatives, hydroxyalkyl cellulose, carboxyalkyl celluloses, carboxyalkyl hydroxyalkyl celluloses, dialkyl carboxyalkyl celluloses, or a combination comprising at least one of the foregoing. In an embodiment, the cement slurries are free of gelling agents.

Extenders include low density aggregates, clays such as hydrous aluminum silicates (e.g., bentonite (85% mineral clay smectite), pozzolan (finely ground pumice of fly ash), diatomaceous earth, silica, e.g., a quartz and condensed silica fumed silica, expanded Pearlite, gilsonite, powdered coal, and the like.

Defoamers include polysiloxanes, paraffinic oils, mineral oils, vegetable oils as well as the mixtures.

Weighting agents are high-specific gravity and finely divided solid materials used to increase density. The rare earth-containing compound can be the only weighting agents present in a cement slurry. Alternatively, the rare earth-containing compounds can be used together with other weighting agents such as silica flour, fly ash, calcium carbonate, barite, hematite, ilmenite, siderite, and the like.

Examples of suitable dispersants include but are not limited to naphthalene sulfonate formaldehyde condensates, acetone formaldehyde sulfite condensates, and glucan delta lactone derivatives. Other dispersants can also be used depending on the application of interest.

Fluid loss control agents can be present, for example a latex, latex copolymers, nonionic, water-soluble synthetic polymers and copolymers, such as guar gums and their derivatives, poly(ethyleneimine), cellulose derivatives, and polystyrene sulfonate.

Clay stabilizers prevent a clay from swelling downhole upon contact with the water or applied fracturing pressure and can be, for example, a quaternary amine, a brine (e.g., KCl brine), choline chloride, tetramethyl ammonium chloride, or the like. Clay stabilizers also include various salts such as NaCl, $CaCl_2$), and KCl, which also act at low concentrations to generally accelerate the set time associated with a cement slurry.

The aqueous carrier fluid of the slurry can be foamed with a liquid hydrocarbon or a gas or liquefied gas such as nitrogen, or air. The fluid can further be foamed by inclusion of a non-gaseous foaming agent. The non-gaseous foaming agent can be amphoteric, cationic, or anionic. Suitable amphoteric foaming agents include alkyl betaines, alkyl sultaines, and alkyl carboxylates. Suitable anionic foaming agents can include alkyl ether sulfates, ethoxylated ether sulfates, phosphate esters, alkyl ether phosphates, ethoxylated alcohol phosphate esters, alkyl sulfates, and alpha olefin sulfonates. Suitable cationic foaming agents can include alkyl quaternary ammonium salts, alkyl benzyl quaternary ammonium salts, and alkyl amido amine quaternary ammonium salts. A foam system is mainly used in low pressure or water sensitive formations. A mixture of foaming and foam stabilizing dispersants can be used. Generally, the mixture can be included in the cement slurries in an amount of about 1% to about 5% by volume of water in the cement slurry.

The solid content of the slurry is about 50 to about 95 wt. % based on the total slurry weight, preferably about 60 to about 90 wt. % based on the total slurry weight, more preferably about 65 to about 85 wt. %, based on the total slurry weight.

The cement slurry can have a viscosity lower than 600 mPa·s at a shear rate of $100\ s^{-1}$. The cement slurry is a low-density cement slurry or a high-density cement slurry. The density of a scavenger or low-density cement slurry can vary with such densities between about 9 up to about 15 pounds per gallon, or about 10 to about 14 pounds per gallons, or about 11 up to about 13 pounds per gallon. The high density cement slurries can have a density of about 15 to about 25 pounds per gallon. In an embodiment, the cement slurry has a density of about 10 to about 20 pounds per gallon or about 12 to about 18 pounds per gallon.

The alginate suspension additive can be combined with the cement slurry "on the fly" via an additive injection nozzle or a chemical injection pump. In other words, the alginate additive is added to the cement slurry while the slurry is pumped downhole. Alternatively, the cement slurry is pre-mixed with the alginate suspension additive on site in a vessel such as a mixer, blender, and the like to provide a blend, and then the blend is immediately injected into the wellbore. The settable slurry can then be injected, e.g., pumped and placed by various conventional cement pumps and tools to any desired location within the wellbore to fill any desired shape form. In an embodiment, injecting the settable slurry comprises pumping the slurry via a tubular in the wellbore. For example, the slurry can be pumped into an annulus between a tubular and a wall of the wellbore via the tubular.

The method is particularly useful for cementing a wellbore, which includes injecting, generally pumping, into the wellbore the settable cementing composition at a pressure sufficient to displace a drilling fluid, for example a drilling mud, a cement spacer, or the like, optionally with a "lead slurry" or a "tail slurry". The settable cementing composition can be introduced between a penetrable/rupturable bottom plug and a solid top plug. Once placed, the settable cementing composition is allowed to harden.

The cementing composition can be used to form downhole components, including various casings, seals, plugs, packings, liners, and the like. In an embodiment the component is a plug, including a temporary plug, permanent plug, or a whipstock plug. The whipstock plug can be used to kick off from a vertical wellbore when a directional change in drilling is desired. The settable slurry can be used in vertical, horizontal, or deviated wellbores.

Further included in this disclosure are the following specific embodiments, which do not necessarily limit the claims.

Embodiment 1

A method of cementing a wellbore, the method comprising: combining an alginate suspension additive with a cement slurry to form a cementing composition, the cement slurry comprising an aqueous carrier and a cementitious component; injecting the cementing composition into the wellbore; and allowing the cement composition to set.

Embodiment 2

The method of claim 1, wherein the alginate suspension additive is added in an amount of about 0.01 wt. % to about 5 wt. % based on the weight of the aqueous carrier in the cement slurry.

Embodiment 3

The method as in any prior embodiment, wherein the alginate suspension additive is added in an amount of about 0.05 wt. % to about 2 wt. % based on the weight of the aqueous carrier in the cement slurry.

Embodiment 4

The method as in any prior embodiment, wherein the alginate suspension additive comprises an alginate, alginic acid, sodium alginate, potassium alginate, ammonium alginate, calcium alginate, zinc alginate, or a combination comprising at least one of the foregoing.

Embodiment 5

The method as in any prior embodiment, wherein the alginate suspension additive comprises an extract from a brown seaweed.

Embodiment 6

The method as in any prior embodiment, wherein the alginate suspension additive is a solid additive.

Embodiment 7

The method as in any prior embodiment, wherein the cement slurry further comprises a setting accelerator, a setting retardant, a gelling agent, a fluid loss control agent, an extender, a defoamer, a weighting agent, a dispersant, a thixotropic agent, a bridging agent or lost circulation material, a silicate material, a clay stabilizer, or a combination comprising at least one of the foregoing.

Embodiment 8

The method as in any prior embodiment, wherein the cement slurry has a density of about 10 to about 20 pounds per gallon.

Embodiment 9

The method as in any prior embodiment, wherein the wellbore has a temperature of less than 200° F.

Embodiment 10

A cement composition comprising: a cementitious component; an aqueous carrier; an alginate suspension additive; and a cement additive comprising a setting accelerator, a setting retardant, a gelling agent, a fluid loss control agent, an extender, a defoamer, a weighting agent, a dispersant, a thixotropic agent, a bridging agent or lost circulation material, a silicate material, a clay stabilizer, or a combination comprising at least one of the foregoing.

Embodiment 11

The cement composition as in any prior embodiment, wherein the alginate suspension additive is present in an amount of about 0.01 wt. % to about 5 wt. % based on the weight of the aqueous carrier.

Embodiment 12

The cement composition as in any prior embodiment, wherein the alginate suspension additive is added in an amount of about 0.05 wt. % to about 2 wt. % based on the weight of the aqueous carrier.

Embodiment 13

The cement composition as in any prior embodiment, wherein the alginate suspension additive comprises an alginate, alginic acid, sodium alginate, potassium alginate, ammonium alginate, calcium alginate, zinc alginate, or a combination comprising at least one of the foregoing.

Embodiment 14

The cement composition as in any prior embodiment, wherein the alginate suspension additive comprises an extract from a brown seaweed.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

The invention claimed is:

1. A method of cementing a wellbore, the method comprising:
combining an alginate suspension additive with a cement slurry to form a cement composition, the cement slurry comprising about 10 wt. % to about 60 wt. % of an aqueous carrier and about 60 wt. % to about 90 wt. % of a cementitious component, each based on the total weight of the cement slurry;
injecting the cement composition into the wellbore; and
allowing the cement composition to set,
wherein the alginate suspension additive is added in an amount of about 0.01 wt. % to about 5 wt. % based on the weight of the aqueous carrier in the cement slurry.

2. The method of claim 1, wherein the alginate suspension additive is added in an amount of about 0.05 wt. % to about 2 wt. % based on the weight of the aqueous carrier in the cement slurry.

3. The method of claim 1, wherein the alginate suspension additive comprises an alginate, alginic acid, sodium alginate, potassium alginate, ammonium alginate, calcium alginate, zinc alginate, or a combination comprising at least one of the foregoing.

4. The method of claim 1, wherein the alginate suspension additive comprises an extract from a brown seaweed.

5. The method of claim 1, wherein the alginate suspension additive is a solid additive.

6. The method of claim 1, wherein the cement slurry further comprises a setting accelerator, a setting retardant, a gelling agent, a fluid loss control agent, an extender, a defoamer, a weighting agent, a dispersant, a thixotropic agent, a bridging agent or lost circulation material, a silicate material, a clay stabilizer, or a combination comprising at least one of the foregoing.

7. The method of claim 1, wherein the cement slurry has a density of about 10 to about 20 pounds per gallon.

8. The method claim 1, wherein the wellbore has a temperature of less than 200° F.

9. The method of claim 1, wherein the cementitious component is present in an amount of about 65 to about 85 wt. %, based on the total weight of the cement slurry.

10. The method of claim 1, wherein the aqueous carrier is present in the cement slurries in an amount of about 20% to about 40% by weight, based on the total weight of the cement slurry.

11. A cement composition comprising:
a cementitious component;
an aqueous carrier;
an alginate suspension additive; and
a cement additive comprising a setting accelerator, a setting retardant, a gelling agent, a fluid loss control agent, an extender, a defoamer, a weighting agent, a dispersant, a thixotropic agent, a bridging agent or lost circulation material, a silicate material, a clay stabilizer, or a combination comprising at least one of the foregoing,
wherein the alginate suspension additive is present in an amount of about 0.01 wt. % to about 5 wt. % based on the weight of the aqueous carrier.

12. The cement composition of claim 11, wherein the alginate suspension additive is added in an amount of about 0.05 wt. % to about 2 wt. % based on the weight of the aqueous carrier.

13. The cement composition of claim 11, wherein the alginate suspension additive comprises an alginate, alginic acid, sodium alginate, potassium alginate, ammonium alginate, calcium alginate, zinc alginate, or a combination comprising at least one of the foregoing.

14. The cement composition of claim 11, wherein the alginate suspension additive comprises an extract from a brown seaweed.

* * * * *